United States Patent
Morris et al.

(10) Patent No.: US 6,308,261 B1
(45) Date of Patent: *Oct. 23, 2001

(54) COMPUTER SYSTEM HAVING AN INSTRUCTION FOR PROBING MEMORY LATENCY

(75) Inventors: Dale C. Morris, Menlo Park, CA (US); Douglas B. Hunt, Fort Collins, CO (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,692

(22) Filed: Jan. 30, 1998

(51) Int. Cl.$^7$ .................................................. G06F 9/38

(52) U.S. Cl. ..................... 712/219; 712/228; 712/234; 712/217; 709/108

(58) Field of Search .................................. 712/234, 228, 712/229, 23, 217–219; 711/122, 152; 709/108

(56) References Cited

U.S. PATENT DOCUMENTS

| | | | |
|---|---|---|---|
| 5,142,631 | * 8/1992 | Murray et al. ....................... | 712/217 |
| 5,251,306 | 10/1993 | Tran . | |
| 5,361,337 | * 11/1994 | Okin ................................... | 712/228 |
| 5,530,825 | * 6/1996 | Balck et al. ........................ | 711/213 |
| 5,802,386 | * 9/1998 | Kahle et al. ......................... | 712/23 |
| 5,838,986 | * 11/1998 | Garg et al. ........................... | 712/23 |
| 5,887,166 | * 3/1999 | Mallick et al. ...................... | 709/102 |
| 5,905,889 | * 5/1999 | Wilhelm, Jr. ........................ | 709/104 |
| 5,913,059 | * 6/1999 | Torii .................................... | 709/104 |
| 5,933,627 | * 8/1999 | Parady ................................. | 712/228 |
| 6,016,542 | * 1/2000 | Gottlieb et al. ..................... | 712/225 |

FOREIGN PATENT DOCUMENTS 0747816   11/1996   (EP) .

OTHER PUBLICATIONS

Gregory T. Byrd, et al., Multithreaded Processor Architectures, Aug. 1, 1995, IEEE Spectrum, IEEE Inc., vol. 32, No. 8, pp. 38–46.

* cited by examiner

*Primary Examiner*—Eddie Chan
*Assistant Examiner*—Gautam R. Patel
(74) *Attorney, Agent, or Firm*—David A. Plettner

(57) ABSTRACT

A computer system includes a data structure that maintains availability status for registers of a processor of the computer system, wherein the availability status indicates whether an instruction attempting to read a particular register will stall. The computer system also includes instruction decode and execution circuitry that is capable of decoding and executing one or more instructions that alter a path of program execution based on the availability status of one or more of the registers. In one embodiment, a latency probe instruction retrieves the availability status of a register from the data structure and stores the availability status in a register. Thereafter, a conditional branch instruction determines the path of program execution based on the availability status stored in the register. In another embodiment, a conditional branch instruction queries the data structure directly to determine the availability status of a register, and determines the execution path based on the availability status. By exposing the latency of memory operations to programs, a compiler can schedule alternate threads of execution based on varying latencies. By scheduling alternate threads of execution based on the availability of the contents of a register, stalling is minimized. The present invention can also be used by a compiler to optimize code. The present invention is relatively easy to implement in many modern computer architectures that support "stall on use" techniques and include "non-blocking caches".

7 Claims, 4 Drawing Sheets

| ld | $r_0=[r_1]$ |
| lprobe | $r_4=r_0$ |
| br | $r_4$, miss_l |
| add | $r_3=r_0,r_2$ |

40 → CODE OPTIMIZED FOR L1 CACHE HIT

•
•
• miss_1:

CODE OPTIMIZED FOR L1 CACHE MISS

| lprobe | $r_4=r_0$ |
| br | $r_4$, miss_2 |
| add | $r_3=r_0,r_2$ |

CODE OPTIMIZED FOR L2 CACHE HIT

42 →

•
•
• miss_2:

FIRST PORTION OF CODE OPTIMIZED FOR L2 CACHE MISS

| add | $r_3=r_0,r_2$ |

44 → SECOND PORTION OF CODE OPTIMIZED FOR L2 CACHE MISS

FIGURE 4

COMPUTER SYSTEM HAVING AN INSTRUCTION FOR PROBING MEMORY LATENCY

FIELD OF THE INVENTION

The present invention relates to computer instructions that are executed in computer systems. More specifically, the present invention relates to a computer instruction that determines whether accessing the contents of a register will cause execution of a program on a computer system to stall, thereby providing an indication of memory latency.

DESCRIPTION OF THE RELATED ART

A typical computer system includes one or more processors, a memory system, and storage media. The memory system typically includes a main memory, and one or more cache memories coupled between the main memory and the processors. The storage media may comprise hard disk drives, floppy disk drives, CD-ROM drives, and the like.

A computer system performs a task by executing a computer program that is comprised of sequences of instructions. The performance of computer systems is greatly affected by the rate at which instructions are executed.

One common type of instruction is a load instruction that retrieves an operand from memory and stores the operand in a register of the processor. If the operand is stored in the cache memory, it will be retrieved quickly. This is known in the art as a "cache hit". However, if the operand is only available in main memory, it may take considerably longer for the operand to be loaded into the register. This is known in the art as a "cache miss". Many computer system will continue to execute instructions after a cache miss until encountering an instruction that requires the operand being loaded into the register from memory. Upon encountering such an instruction, the processor will stall execution of that instruction and wait for the load to finish. This technique is known in the art as "stall on use", and cache memories that support this strategy are known as "non-blocking caches".

The performance of processors is increasing faster than the performance of main memory systems. Current computer systems may require up to 100 processor cycles to retrieve an operand from main memory, and it is expected that future computer systems will require 1000 or more processor cycles. Accordingly, to achieve optimal system performance it is important to ensure that the processor has other instructions that can be executed while an operand is being retrieved from main memory. Ideally, the processor should never have to stall while waiting for a load to complete.

Some computer systems are capable of executing instructions out-of-order and are therefore able to defer stalling by executing other instructions while waiting for a load to complete. However, out-of-order execution requires complex hardware, and the window of instructions that are eligible to be executed out-of-order is relatively small (no more than a few hundred instructions). In addition, as more logic of a CPU is devoted to supporting out-of-order execution, less logic is available to perform the functions specified by the instructions.

Other techniques allow the processor to switch contexts when it is determined that the current stream of instructions cannot proceed because an operand is not available. For example, it is possible to maintain multiple contexts within the CPU, and simply switch to another context when a stall occurs. However, this approach requires extra hardware for maintaining multiple contexts, and like out-of-order execution, thereby reduces the hardware available to perform the functions specified by the instructions. It is also possible to generate an interrupt upon stalling and have software switch to some other thread or process. While this approach works well for longer latencies, such as retrieving data from a disk, the overhead incurred prohibits this approach when dealing with shorter latencies, such as accessing data from main memory.

Another technique is to model the latencies of various operations involved in executing instructions when a computer program is compiled. By scheduling instructions based on latency models, a compiler can significantly reduce stalling. For example, if a latency model indicates that a cache miss will require 30 CPU cycles, and a compiler can determine that a particular load instruction will generate a cache miss, a compiler can schedule a memory pre-fetch operation to retrieve the operand at least 30 cycles before the operand is needed.

Unfortunately, latencies are often difficult to predict at compile time. A compiler may not be able to determine whether a particular load will produce a cache miss or a cache hit. In addition, a single version of "shrink wrap" software is often marketed for a particular instruction set. However, such software may be executed on a wide variety of computer systems having substantial differences in performance and architecture. For example, a program written for the Intel x86 instruction set may be executed on computer systems ranging from a laptop computer having a Pentium® CPU, no external L2 cache, and fast page mode DRAM memory, to a computer workstation having multiple Pentium® II CPUs (with each CPU having an L1 and L2 cache) and synchronous DRAM memory.

Dynamic variable latencies were addressed by Mark Horowitz, Margaret Martonosi, Todd Mowry, and Michael Smith in a first paper entitled "Informing Loads: Enabling Software to Observe and React to Memory Behavior", which was published in July of 1995, and in second paper entitled "Informing Memory Operations: Providing Memory Performance Feedback in Modern Processors. Both these papers are hereby incorporated by reference. These papers proposes a class of instructions called "informing load instructions". An informing load instruction causes execution of the instruction immediately after the informing load instruction to be skipped if the load operation produces a cache hit, and executes the instruction immediately after the informing load instruction if the load operation produces a cache miss. Informing loads are non-blocking loads that do not stall execution. By scheduling a branch instruction immediately after an informing load operation, informing load instructions allow a compiler to schedule alternate action while a cache miss caused by an informing load operation is serviced.

While an informing load operation indicates whether a particular operand is in the first level cache, it does not provide an indication of the magnitude of the latency. The operand may be in an L2 cache, it may be in main memory, or it may be present as a dirty line in the cache of another CPU. Accordingly, informing load operations do not provide compilers with a method of scheduling alternate code threads based on the magnitude of the latency. Nor do informing loads provide a mechanism for a program to confirm that the contents of a register are available after the informing load itself has been executed.

SUMMARY OF THE INVENTION

The present invention is a computer system that includes a data structure that maintains availability status for registers of a processor of the computer system, wherein the availability status indicates whether an instruction attempting to read a particular register will stall. The computer system also includes instruction decode and execution circuitry that is capable of decoding and executing one or more instructions that alter a path of program execution based on the availability status of one or more of the registers.

In one embodiment, a latency probe instruction retrieves the availability status of a register from the data structure and stores the availability status in a register. Thereafter, a conditional branch instruction determines the path of program execution based on the availability status stored in the register. In another embodiment, a conditional branch instruction queries the data structure directly to determine the availability status of a register, and determines the execution path based on the availability status.

The present invention exposes the latency of memory operations to programs, thereby allowing a compiler to schedule alternate threads of execution based on varying latencies. By scheduling alternate threads of execution based on the availability of the contents of a register, stalling is minimized. If the compiler can accurately model the latencies caused by cache hits and misses, code can be scheduled to check for the availability of register contents at predefined intervals that correspond with predicted cache events. Alternatively, if the compiler cannot accurately model latencies, the compiler can schedule code to periodically check for the availability of register contents.

In addition, the present invention can also be used by a compiler to optimize code. The present invention provides a powerful method to collect data while a program is executing. The collected data can be used to optimize an execution file when a program is recompiled. The present invention can also be used by a compiler to schedule code that monitors performance, and in essence, recompiles itself "on-the-fly" as it executes.

One of the most compelling features of the present invention is that it is easy to implement in many modern computer architectures. Processors that support "stall on use" techniques and include "non-blocking caches" typically contain data structures capable of providing availability status for registers of the processor. In such a processor design, it is a relatively easy design task to encode an instruction that allows the availability status of registers to be tested by a conditional branch instruction.

BRIEF DESCRIPTION OF THE DRAWINGS

FIG. 4 illustrates one simple application of a computer instruction provided by the present invention.

DETAILED DESCRIPTION OF THE PREFERRED EMBODIMENTS

The present invention is a computer system capable of executing a computer instruction that determines whether an operand is available in a register. By executing the instruction of the present invention at various intervals, it is possible to probe the latency of a memory load operation.

Figure 1:
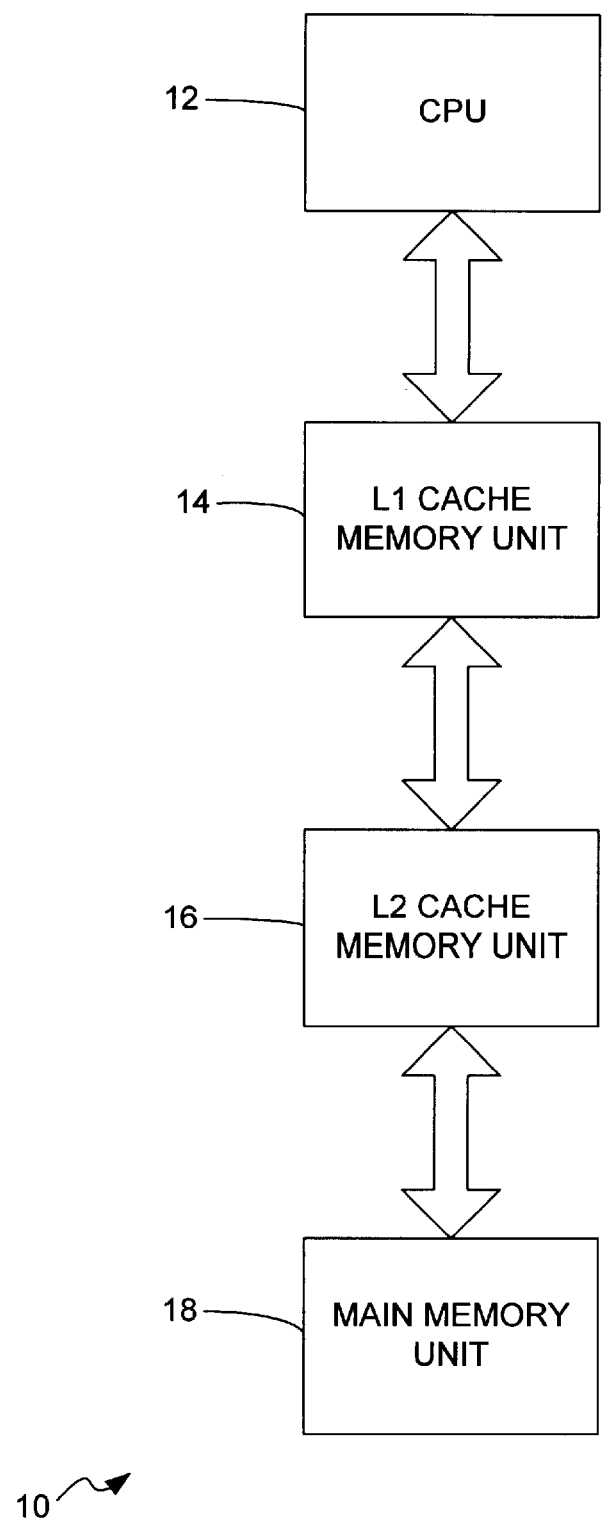
FIG. 1 is a block diagram of a prior art computer system that includes a central processing unit (CPU), a level one (L1) cache memory unit, a level two (L2) cache memory unit, and a main memory unit.

FIG. 1 is a block diagram of a prior art computer system 10. Computer system 10 includes a central processing unit (CPU) 12, a level one (L1) cache memory unit 14, a level two (L2) cache memory unit 16, and a main memory unit 18. L1 cache memory unit 14 comprises a relatively small amount of fast, expensive memory that is closely coupled to CPU 12, and stores a subset of the memory contents of main memory unit 18. Many prior art CPUs include an L1 cache on the same integrated circuit as the CPU itself. Typically, a memory operand can be loaded from L1 cache memory unit 14 into a register of CPU 12 within one or two instruction clock cycles.

Compared with L1 cache memory unit 14, L2 cache memory unit 16 comprises a relatively larger (and relatively slower) amount of memory. L2 cache memory unit 16 also stores a subset of the contents of main memory unit 18. Typically, a memory operand can be loaded from L2 cache memory unit 16 within several instruction clock cycles.

Main memory unit 18 comprises a large amount of relatively slow memory. It may take 100 or more instructions clock cycles to load a memory operand from main memory unit 18 into a register of CPU 12.

While computer system 10 represents many prior art configurations, there are of course many other configurations. For example, it is common to have more or fewer cache memories. It is also common to have multiple processors, with processors possibly sharing some caches and having exclusive access to other caches.

Note that the latency of a memory operation varies depending upon whether a particular memory operand is stored in a particular cache memory unit. Often, a compiler will be able to predict if an operand is in a particular cache memory unit, and schedule code accordingly. However, it is also common that a compiler will not be able to determine whether an operand will be in any of the cache memories.

In many prior art computer systems, the CPU does not stall when a load instructions that loads an operand from memory into a register produces a cache miss. Rather, the CPU continues to execute instructions until reaching an later instruction that requires the contents of that register. If the operand has been loaded from memory, the later instruction is executed. If the operand has not been loaded from memory, execution (of at least the later instruction) is suspended until the cache miss is serviced, at which point execution resumes with the later instruction. This technique is known in the art as "stall on use", and cache memories that support this strategy are known as "non-blocking caches".

Figure 2:
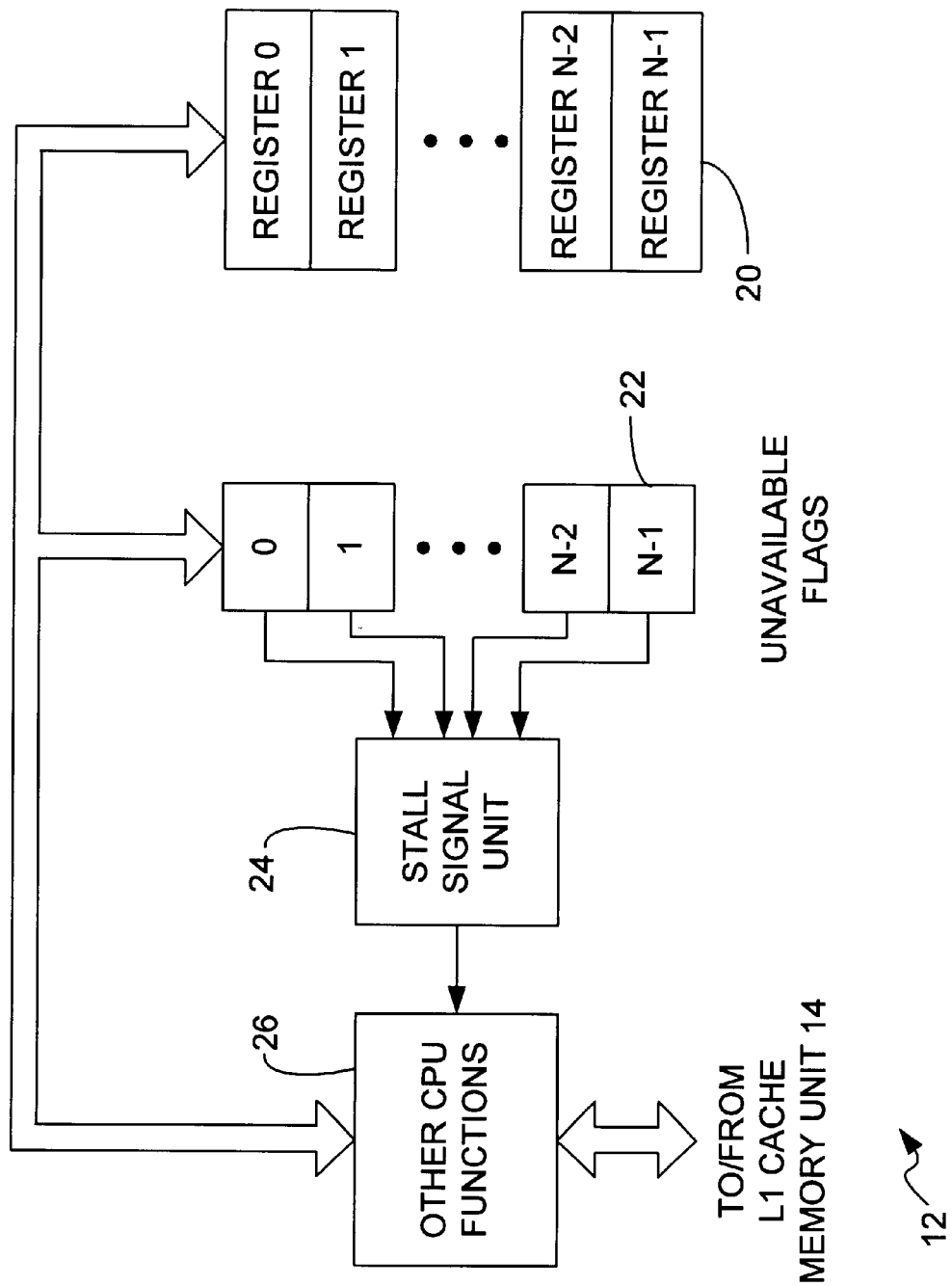
FIG. 2 is a simplified illustration of a common prior art technique for determining whether a processor should suspend execution because the contents of a register are not available.

FIG. 2 is a simplified illustration of a common prior art technique for determining whether a processor should suspend execution because the contents of a register are not available. In FIG. 2, CPU 12 includes registers 20, unavailable flags 22, and stall signal unit 24. Other CPU functions, such as those provided by instruction decode units, floating point execution units, integer execution units, memory access units, and the like are represented generically as box 26.

To understand how CPU 12 determines whether execution should be suspended, assume that CPU 12 begins to execute a load instruction that loads the contents of the memory location specified by the contents of register 1 ($r_1$) into register 0 ($r_0$). Such an instruction can be represented as:

ld $r_0$=[$r_1$]

Further assume that the contents of the memory location specified by the contents of $r_1$ are in L1 cache memory unit 14. When instruction is executed, the unavailable flag 22 associated with $r_0$ is set to "1" to indicate that the contents of $r_0$ are unavailable. The next instruction clock cycle, the $r_0$ will be loaded from L1 cache memory unit 14 and the unavailable flag 22 associated with $r_0$ will be cleared to "0" to indicate that the contents of $r_0$ are available.

Now assume that the next instruction is:

add $r_3=r_0, r_2$

This instruction will add the contents of $r_0$ and $r_2$ and store the result in $r_3$. Assume that the contents of $r_2$ are available, and therefore the unavailable flag 22 associated with $r_2$ is cleared to "0". When the instruction begins to execute, stall signal unit 24 generates a stall signal based on the unavailable flags 22 associated with $r_0$ and $r_2$. Since the contents of both registers are available, the stall signal is not asserted and the add instruction is executed.

Now assume that the same sequence of instructions is executed, except that the contents of the memory location specified by the contents of $r_1$ are stored in main memory unit 18, but not cache memory units 14 or 16. Accordingly, the contents of $r_0$ will not be available at the next instruction clock cycle when the add instruction is executed. Stall signal unit 24 will assert a stall signal, which will be used by CPU 12 to stall execution until the memory contents are loaded from main memory unit 18 into $r_0$. When the memory contents are loaded, execution of the add instruction will be completed.

Of course, the example discussed above with reference to FIG. 2 is simplified. In a CPU supporting pipelined execution, the function provided by unavailable flags 22 is provided by a more complex mechanism. Consider a CPU having a five-stage pipeline comprised of the stages of instruction fetch (IF), instruction decode and register fetch (RD), execution (EX), data memory access (ME), and register write back (WB). Assume that such a processor also has a table of outstanding memory read transactions, with each active entry in the table including a register address specifying the destination register that will receive the results of the transaction. If an instruction is going to stall because the contents of a register are not available, it will stall at the RD stage. To generate a stall signal at the RD stage, it must be determined if any of the instructions in later stages of the pipeline or the transactions in the table of outstanding memory read transactions will store data in the register that is read at the RD stage. Accordingly, in such a processor the function performed by unavailable flags 22 and stall signal unit 24 in FIG. 2 is performed by a series of comparators and OR gates that compare the source register of the instruction at the RD stage with the destination registers of instructions at later stages and the destination registers stored in active entries of the table of outstanding memory read transactions, with the stall signal being generated by OR'ing together the results from all the comparators. Of course, those knowledgeable in the art will recognize that a variety of different data structures and techniques may by used to keep track of whether the contents of a register will be available. In addition, those knowledgeable in the art will also recognize that execution need only be stalled for the instruction that requires the register contents that are unavailable. Execution of other instructions, as well as other unrelated CPU functions, may continue.

Figure 3:
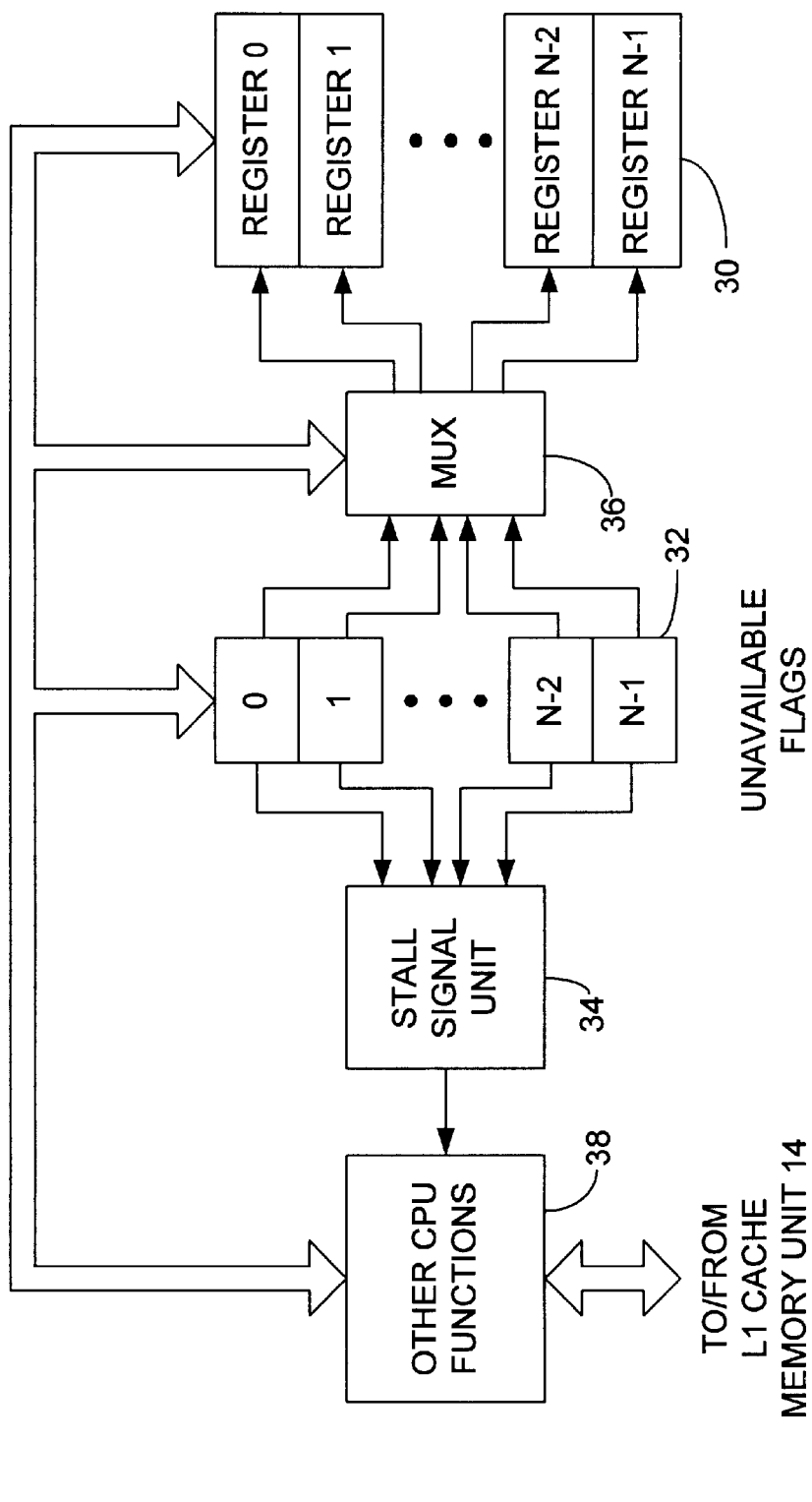
FIG. 3 is a simplified block diagram of CPU in accordance with the present invention.

The present invention provides a mechanism for allowing a computer program to ascertain whether the contents of a register are available, or whether accessing that register will cause execution to stall. FIG. 3 is a simplified block diagram of CPU 28. FIG. 3 illustrates how CPU 12 of FIG. 1 may be modified to implement the present invention. Similar to CPU 12, CPU 28 includes registers 30, unavailable flags 32, and stall signal unit 34. CPU 28 also includes multiplexer 36, which is capable of routing the contents of any of the unavailable flags 32 into any of the registers 30. Finally, the CPU functions represented by box 38 include circuitry capable of decoding an instruction in accordance with the present invention (discussed below) and controlling multiplexer 36.

Multiplexer 36 represents any mechanism capable of linking an unavailable flag into a register. For understanding the present invention, separate data paths are shown linking multiplexer 35 with unavailable flags 32 and register 30. However, those skilled in the are will recognize that the functions represented by multiplexer 36 would likely be implemented by driving a bit of a common data path leading into the registers to a value stored in one of the unavailable flags. In addition, in a pipelined processor, the function performed by unavailable flags 32 may be performed by comparators that compare a source register address with destination register addresses in later stages of the pipeline and in a table of outstanding memory read transactions, as discussed above with reference to FIG. 2. As used herein, the term "unavailable flag" includes availability status generated in such a manner.

The circuitry required to decode a computer instruction in accordance with the present invention is represented by box 38. Those skilled in the prior art will recognize how to adapt the teachings herein to properly define an operation code for an instruction in accordance with the present invention, and design appropriate decode logic to decode the instruction and operate multiplexer 36 to implement the functionality described herein.

Consider an instruction in accordance with the present invention called a latency probe instruction. One format for such an instruction is:

lprobe $r_i=r_j$

When an iprobe instruction is executed, the unavailable flag 32 associated with $r_j$ is stored in $r_i$. Accordingly, the contents of $r_i$ will be "0" if the contents of $r_j$ are available, and the contents of $r_i$ will be "1" if the contents of $r_j$ are unavailable. The contents of $r_i$ may then be tested via a conditional branch instruction to determine whether to execute an instruction that accesses register $r_j$. Of course, other instructions in accordance with the present invention are also possible. For example, in one embodiment the processor may include condition (or predicate) registers that are used to control branching behavior, and an iprobe instruction may be defined to transfer the specified unavailable flag 32 to a specified condition register. In another embodiment, a class of branch instructions may be defined to treat the unavailable flags as registers upon which a conditional branch may be based. One format for such an instruction is:

br $r_j$.uf, miss

Such an instruction would branch to the address miss only if the unavailable flag associated with $r_j$ were unavailable.

Of course, many other instruction encodings are possible. The key to the present invention is that the data structure or technique that is used to determine whether the contents of a register are available may be queried by a computer instruction to determine whether an instruction that accesses the register will stall, and the thread of execution can be varied based on the results of the query. Accordingly, the present invention exposes the latency of register load operations to a compiler, thereby allowing a compiler to schedule alternate threads based on whether the contents of a register will be available.

FIG. 4 illustrates one simple application of the computer instruction of the present invention. Assume that a CPU in accordance with the present invention, such as CPU 28 in FIG. 3, is present in a computer system having L1 and L2 cache units, and a main memory unit, such as computer system 10 in FIG. 1. Further assume that a compiler has accurate latency models that predict the latencies of an L1 and L2 cache hits and misses, and the compiler must schedule code which loads the memory contents specified by the contents of $r_i$ into $r_0$, and adds the contents of $r_0$ and $r_2$ and stores the results into $r_3$. Also assume that the compiler is able to predict that the contents of $r_2$ will be available.

First, the compiler schedules code segment 40. The first instruction in code segment 40 loads the memory contents specified by the contents of $r_1$ into $r_0$. The next instruction is an iprobe instruction that loads register $r_4$ with the contents of the unavailable flag 32 associated with $r_0$. The next instruction is a branch instruction that tests the contents of register $r_4$. If the contents of $r_0$ are available, $r_4$ will be "0" and the branch will fail, which is consistent with an L1 cache hit. The next instruction adds the contents of $r_0$ and $r_2$ and stores the results into $r_3$. The remainder of the code in segment 40 is code that has been optimized based on the assumption of an L1 cache hit. If the contents of $r_0$ are unavailable, $r_4$ will be "1" and the branch will direct execution to code segment 42, which is at address miss__1.

Code segment 42 first executes a series of instructions that are optimized based on the assumption of an L1 cache miss. The compiler assumes that the memory contents being loaded into $r_0$ are stored in the L2 cache and identifies and schedules other instructions that may be executed during that time the compiler expects the memory contents specified by the contents of $r_1$ are possibly retrieved from the L2 cache. After these instructions have been executed, another iprobe instruction is executed that loads $r_4$ with the unavailable flag 32 associated with $r_0$. The next instruction is a branch instruction which tests the contents of $r_4$. If the contents of $r_0$ are available, the branch will fail, which is consistent with an L2cache hit. Execution will then continue with add instruction and other instructions that were scheduled based on an L2 cache hit. However, if the contents of $r_0$ are not available, the branch will be taken to code segment 44, which is at address miss__2.

In code segment 44, the compiler has scheduled a first portion of code that is optimized for an L2 cache miss. The compiler's latency model predicts that after the first portion has been executed, sufficient time will have passed to allow the L2 cache miss to be serviced, and the contents of $r_0$ will be available. Thereafter, the add instruction is executed along with other instructions that the compiler scheduled to be executed based on an assumption of an L2 cache miss.

The above example illustrates how a compiler can use the instruction of the present invention to schedule code around a register load having an unknown, but limited and defined set of possible latencies. By scheduling lprobe instructions at periodic intervals, it is also possible to schedule code when the set of latencies cannot be defined, such as when data being loaded is being held in a dirty cache line of another CPU.

In addition, the present invention can also be used by a compiler to optimize code. For example, it is known in the art to collect data during a profile-based optimization (PBO) execution session. The program is then recompiled to using the collected data to produce an optimized executable version of the program. The present invention provides a powerful method to collect data during the PBO session, since lprobe instruction may be used to detect cache misses, and measure memory latencies.

Another application for the present invention is continuous run-time optimization. It is anticipated that the number of computer system configurations will continue to proliferate. In the future, it may be common for a single compiled computer program to be expected to execute efficiently on various computer systems have different memory configurations and numbers of CPUs. It may not be practical to anticipate all possible configurations when a program is compiled. Therefore, it is expected that programs will include code to monitor performance, and in essence recompile "on-the-fly" as they execute. The present invention provides a mechanism for a program to monitor its performance, and reschedule its code accordingly. Unlike prior techniques, the present invention not only allows a program to determine if a register load produces cache hit, it also allows a program to measure how long it takes for the content of the register to become available.

Besides being able to use the present invention to change the path of execution of a program when the contents of a register are not available, the present invention can also be used to control cache prefetch operations in a computer system capable of executing instructions out-of-order. For example, assume that a branch condition is determined based on a value loaded from memory. If the loaded value is in the cache, it will not be long before the processor computes the result and resolves the branch condition. Accordingly, the potential benefit of starting a speculative cache prefetch operation is small since it will soon be known whether a the load instruction requiring the prefetch is on the execution path. Since the benefit is small, it may be desirable to avoid the prefetch operation to avoid polluting the cache with unneeded data. On the other hand, if the load required to determine the branch condition produces a cache miss, it will take some time for the processor to resolve the branch condition. In this situation, the benefit of performing a speculative prefetch operation for a load instruction along a predicted (but not yet confirmed) execution path is greater. The present invention provides a low-overhead mechanism to allow a compiler to schedule code that determines whether a branch condition will be resolved quickly, and thereby decide whether to follow an execution path that includes speculative prefetch operations.

Perhaps one of the greatest benefits of the present invention is that it is relatively simple to implement and requires little additional circuitry in processor architectures that support "stall on use" techniques and include "nonblocking" caches. Such processors already include substantial circuitry to generate a stall signal. In accordance with the present invention, all that must be added to such a processor is an instruction that activates that circuitry to produce a stall signal for a particular register, and stores the result of the stall signal in another register (or branches based on the stall signal). Accordingly, the present invention can be implemented by a handful of gates that decode the instruction and divert the already present stall signal into the data path of a destination register.

Although the present invention has been described with reference to preferred embodiments, workers skilled in the art will recognize that changes may be made in form and detail without departing from the spirit and scope of the invention.

What is claimed is:

1. A computer system comprising:
   a main memory unit;
   one or more cache memory units coupled to the main memory unit; and
   a CPU, the CPU including:
      one or more registers;
      a data structure that maintains availability status for each of the registers, wherein the availability status indicates whether an instruction attempting to read a particular register will stall while an operand is being loaded into that register;

instruction decode and execution circuitry capable of decoding and executing one or more instructions that test the availability status of one or more of the registers and alter a path of program execution based on the availability status, threreby exposing latencies of register load operations to allow a compiler to schedule alternate paths of program execution based on whether the contents of a register will be available.

2. The computer system of claim 1 wherein the data structure comprises one or more unavailable flags, with each unavailable flag corresponding to a register.

3. The computer system of claim 2 wherein a first instruction is defined that specifies a selected register and a selected unavailable flag, and the instruction decode and execution circuitry includes a multiplexer capable of routing the availability status of a selected unavailable flag to a selected register.

4. The computer system of claim 1 wherein the data structure comprises a comparison between a source register and a series of destination registers.

5. A method of selecting alternate threads of execution within a program comprising:

executing a first instruction of the program to query a data structure to determine whether execution of a second instruction that attempts to read a register will stall while an operand is being loaded into the register;

selecting a first execution thread that includes the second instruction if execution of the second instruction will not stall; and selecting a second execution thread that does not include the second instruction if execution of the second instruction will stall while the operand is being loaded into the register, thereby exposing latencies of register load operations to allow a compiler to schedule alternate paths of program execution based on whether the contents of a register will be available.

6. The method of claim 5 wherein executing a first instruction of the program to query a data structure to determine whether execution of a second instruction that attempts to read a register will stall while an operand is being loaded into the register comprises:

executing a first instruction that transfers available status for a first register from an unavailable flag associated with the first register to a second register.

7. The method of claim 6 wherein selecting a first thread of execution and selecting a second thread of execution collectively comprise:

executing a conditional branch instruction that routes execution to either the first or second execution threads based on contents of the second register.

* * * * *